(12) United States Patent
Crotts et al.

(10) Patent No.: US 6,215,943 B1
(45) Date of Patent: Apr. 10, 2001

(54) OPTICAL FIBER HOLDER

(75) Inventors: Ricky L. Crotts, Salem; Timothy A. Bailey, Roanoke; Kent A. Murphy, Troutville; Mark E. Jones, Blacksburg, all of VA (US)

(73) Assignee: Luna Innovations, Inc., Blacksburg, VA (US)

( * ) Notice: Subject to any disclaimer, the term of this patent is extended or adjusted under 35 U.S.C. 154(b) by 0 days.

(21) Appl. No.: 09/103,370

(22) Filed: Jun. 23, 1998

(51) Int. Cl.[7] .................................................... G02B 6/00

(52) U.S. Cl. ............................ 385/137; 385/12; 385/13; 385/37

(58) Field of Search .................................. 385/12, 13, 37, 385/137; 250/227.14; 606/15

(56) References Cited

U.S. PATENT DOCUMENTS

| | | | |
|---|---|---|---|
| 4,592,353 | * | 6/1986 | Daikuzono ........................ 128/303.1 |
| 5,216,734 | * | 6/1993 | Grinderslev ............................ 385/60 |
| 5,246,437 | * | 9/1993 | Abela .................................... 385/137 |
| 5,757,540 | * | 5/1998 | Judkins et al. ....................... 359/341 |
| 5,987,200 | * | 11/1999 | Fleming et al. ........................ 385/37 |

OTHER PUBLICATIONS

M.V. Cattaneo, K.B. Male, J.H.T. Luong, "A Chemiluminescence Fiber–Optic biosensor system for the Determination of Glutamine in Mammalian Cell Cultures," *Biosensors & Bioelectronics*, May 4, 1992, pp. 569–574, vol. 7, Elsevier Science Publishers Ltd, U.S.A.

J.E. Ford, J.A. Walker, J.E. Cunningham, M.D. Feuer, "Transmissive Fiber Optic Packaging for Reflective Modulators," *LEOS 9th Annual Meeting*, Nov. 18, 1996, pp. 244–245, Boston, MA, U.S.A.

Anton Hu Doug Ferrell, Marco Hernandez, "Miniature Optic Fiber Couplers for Fiber Optic Gyros Application," *SPIE*, 1996, pp. 324–329, vol. 2837, Denver, CO, U.S.A.

M.H. Maher, K. Tabrizi, J.D. Prohaska, E. Snitzer, "Fiber Bragg Gratings for Civil Engineering Applications," *SPIE*, 1996, pp. 298–302, vol. 2682, San Jose, CA, U.S.A.

R.M. Smith, K.W. Jackson, K.M. Aldous, "Design and Evaluation of a Fiber Optic Fluorometric Flow Cell," *Analytical Chemistry*, Nov. 13, 1977, vol. 49, No. 13, U.S.A.

* cited by examiner

Primary Examiner—Cassandra Spyrou
Assistant Examiner—Craig Curtis
(74) Attorney, Agent, or Firm—Joy L. Bryant

(57) ABSTRACT

An optical fiber holder is presented. The optical fiber holder comprises a tube having a longitudinal axis, a first end for receiving an optical fiber, and a recessed second end for protecting the optical fiber tip. An aperture is disposed along a length of the longitudinal axis of the tube for exposing the optical fiber to a sample. The optical fiber holder allows a sample to be tested while avoiding strain and bending influences.

22 Claims, 3 Drawing Sheets

OPTICAL FIBER HOLDER

FIELD OF THE INVENTION

The present invention relates to optical fiber holders. In particular, it relates to an optical fiber holder used for optical sensing.

BACKGROUND OF THE INVENTION

The uses of optical fiber devices are increasing for communications and sensing applications due to inherent advantages in bandwidth, size, weight, immunity to electromagnetic interference, and ruggedness. The conditions to which these devices are exposed necessitate packaging of the components in a way that will withstand various environmental effects. For communications applications, this means isolating the device from the environment in a way such that the operation of the device is not altered by peturbations such as temperature and bending. In sensing applications, it is desirable that the packaging of the optical sensor allows the sensor to be exposed to one specific isolated perturbation without exposing the sensor to other environmental factors such as bending or strain.

Traditionally, optical fiber devices used in communications applications shield the device entirely from the environment. The optical fiber is packaged by attaching the device to a substrate made from a low thermal expansion material. Typically, the material chosen is based on closely matching the thermal properties of the material to that of fused silica. Various epoxies that have a low thermal response are used in the attachment procedure. The device is then encased in a secondary epoxy or material that isolates the optical fiber device from strain and outside environmental effects. The coating also prevents material from encountering the optical fiber device. A protective sheath is used for additional strength and protection around the outside of the component. In some cases, the fiber that ingresses and egresses the packaged device is protected with additional sheathing that acts as a strain relief. This method results in the component being completely shielded from the environment and is not useful for applications requiring exposure to a particular environment.

Bulk optic devices or extrinsic components are also packaged to isolate response from the environment. The methods of isolation include hard mounting the bulk components and isolating alignment from the environment through the use of ceramic ferrules. As with the communications applications, no external parameter is allowed to influence the performance of the optical fiber device and thus this packaging is inadequate for applications requiring direct environmental contact.

Optical fibers employed in sensing applications require similar packaging considerations to those used for communication and bulk optic devices. The fiber Bragg grating (FBG) is one of the most deployed optical fiber sensors and produces a spectrally dependent signal. Changes in the environment shift the operational wavelength of the device. Measurement of the wavelength provides an indication of perturbation strength. Typically, FBG devices have been used to monitor strain or temperature. Packaging requires a strain compatibility with the sensor to realize actual strains present in the surroundings. A strong strain transfer is accomplished by using an epoxy to attach the fiber device in a small thin walled steel tube. The fiber is jacketed with cabling to provide enhanced survivability. This packaging works well for measuring strain, however, it cannot be used for applications where the strain and bending factors are to be minimized or eliminated.

In other packaging methods, the fiber device is directly attached to the test surface and an epoxy is used as an overcoat; or the FBG sensors are discretely attached to surfaces using localized epoxy sites. This attachment allows the sensor to measure environmental changes such as strain and bending but, due to strain transfer, does not allow for the detection of other isolated environmental factors such as temperature or refractive index changes.

Flow cells have been constructed for liquid-phase measurements using fluorescent-based devices that require the sensor surface be in contact with the environment. These flow cells are primarily designed to enhance the sensing characteristics of a particular component by blocking background light from influencing sensor response. The device enclosure is constructed in a way to limit background light, a primary noise factor in fluorescent applications. The cell does not take into account rigid support for the optical fiber or additional processing needs such as mode stripping. Lastly, flow cells have limiting configurations that require external pumps or other methods to bring the external environment to the sensor as opposed to directly exposing the sensor to the external environment.

SUMMARY OF THE INVENTION

An object of the present invention is to provide an optical fiber holder that allows for direct exposure of an optical fiber to an environment without exposing the fiber to bending or strain factors.

Another object of the present invention is to provide a process for preparing an optical fiber holder.

Another object of the present invention is to provide a process for determining a change in a sample that utilizes an optical fiber device disposed within an optical fiber holder.

By the present invention an optical fiber holder is presented. The optical fiber holder isolates the optical fiber from bending and strain factors while the optical fiber is in physical contact with a particular environment. Such a holder is particularly useful for chemical or biological sensing or in systems requiring a feedback mechanism. The simplified architecture allows for the construction of single attachment point devices.

The optical fiber holder comprises a tube having a longitudinal axis. There is a first end for receiving an optical fiber and a recessed second end for protecting the optical fiber tip. An aperture is disposed along a length of the longitudinal axis of the tube. The aperture allows for exposure of the optical fiber to a sample.

The optical fiber holder is prepared by first providing a tube having a first end for receiving the optical fiber and a recessed second end for protecting the optical fiber tip. The tube also has a longitudinal axis. An aperture is inserted along a length of the longitudinal axis of the tube for exposing the optical fiber to a sample.

A change in a sample is determined by disposing an optical fiber device having a sensing element into the optical fiber holder. The optical fiber holder has an aperture and the sensing element is positioned within the aperture. The optical fiber holder is then inserted into a vessel containing a sample and the sample is circulated past the sensing element.

Alternatively, a plurality of samples may be tested for the same environmental change by employing a plurality of optical fiber holders. Each optical fiber holder comprises a tube having a first end, a recessed second end, a longitudinal axis, and an aperture disposed along a length of the longitudinal axis of the tube. An optical fiber device having a sensing element is disposed within each optical fiber holder such that the sensing element is positioned within the aperture. The optical fiber devices are multiplexed in parallel to form an array format which is then inserted into a well format to test each sample.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

Figure 1:
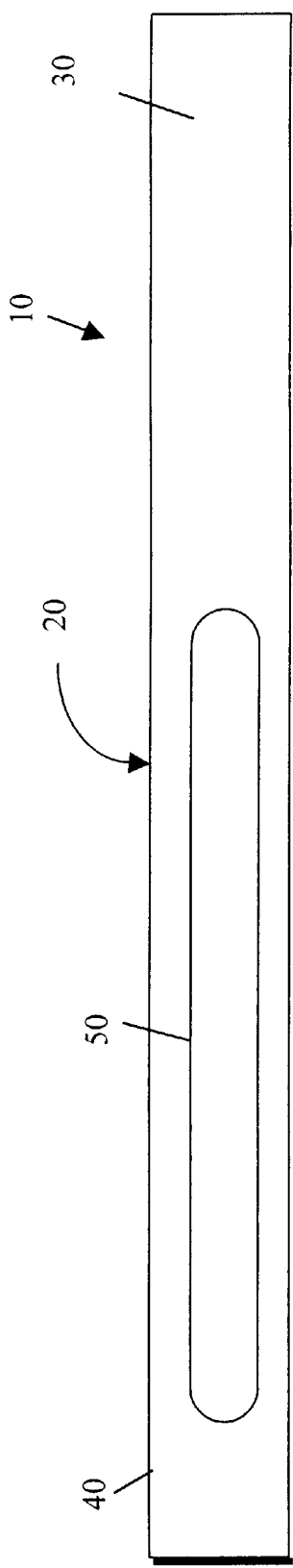
FIG. 1 is a top view of the optical fiber holder without an optical fiber disposed therein.

The following description refers to the structure and method of fabrication for the optical fiber holder of the present invention. Referring more specifically to the drawings where identical parts are numbered the same, FIG. 1 depicts the optical fiber holder 10. The optical fiber holder 10 comprises a tube 20 having a longitudinal axis, a first end 30 for receiving an optical fiber (not shown) and a recessed second end 40 for protecting the optical fiber tip. An aperture 50 is disposed along a length of the longitudinal axis of the tube for exposing the optical fiber (not shown) to a sample.

Figure 2:
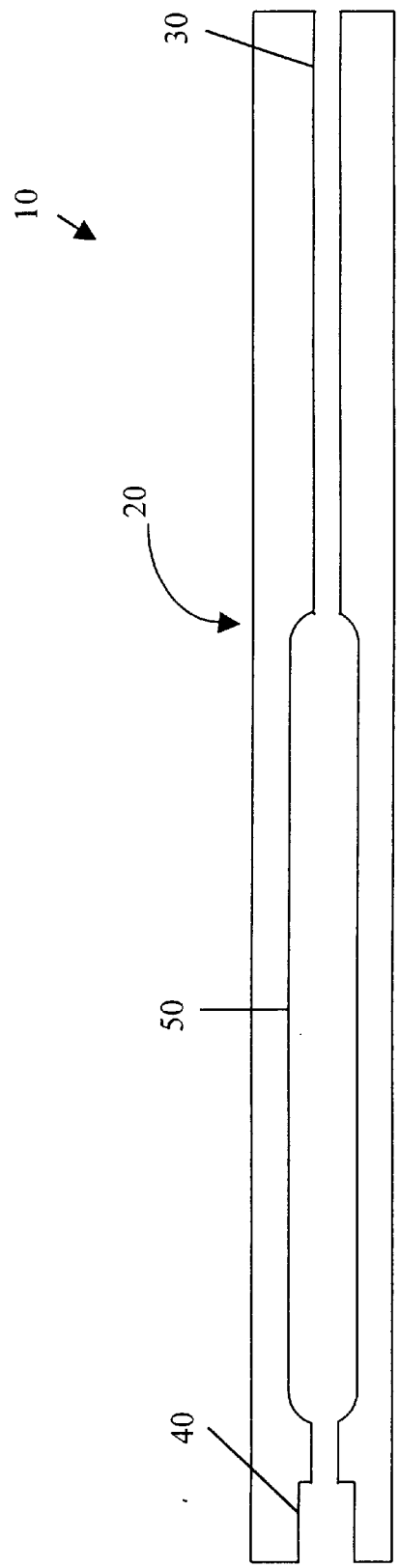
FIG. 2 is a cutaway view of the optical fiber holder without an optical fiber disposed therein.

FIG. 2 provides a cutaway view of the optical fiber holder 10 without the optical fiber disposed therein. When fabricating the optical fiber holder 10, the tube 20 may be made from any material known to those skilled in the art. Such materials include a silicon micromachined material; a shaped plastic; an epoxy resin; and a metal having a low coefficient of thermal expansion. The plastic may be any plastic known to those skilled in the art and, in particular is polyether ether ketone. The plastic is shaped by processes such as extrusion, molding or casting. Various metals having low coefficients of thermal expansion may be used for the present invention such as nickel steel metal alloy. The tube 20 is shaped to have an inner diameter throughout its length that is matched closely to the outer diameter of the optical fiber to prevent the fiber from bending. Preferably the inner diameter ranges from about 200 microns to about 400 microns larger than the outer diameter of the optical fiber (not shown) which is disposed within the tube. The recessed second end 40 of the tube 20 has a slightly larger inner diameter than that of the first end 30 of the tube 20 where the optical fiber is received. The recessed second end 40 permits the optical fiber to be seated below the surface of the end of the tube 20 and serves two functions: 1) to protect the tip of the optical fiber; and 2) to serve as a means for holding a sealing material, preferably an epoxy, that will anchor the fiber in the tube and protect the fiber from abrasion and rough contact. Along a length of the longitudinal axis of the tube 20 is an aperture 50. The aperture 50 serves as a window to the outside environment permitting the optical fiber to be exposed to a sample. The size and the location of the aperture 50 is dictated by the viscosity of the sample to be tested. In particular, the size of the aperture 50 is such that capillary forces are prevented from trapping liquid or other contaminants in the tube 20. The aperture 50 may or may not pass completely through the tube 20. FIGS. 1 and 2 show a preferred embodiment where the aperture 50 is an elongated slot that passes through the tube 20. Alternatively, FIG. 3 shows a side view of the optical fiber holder 10 where the aperture 50 is formed by removing a portion of the outer wall of the tube 20 such that the aperture does not pass completely through the tube 20.

Figure 3:
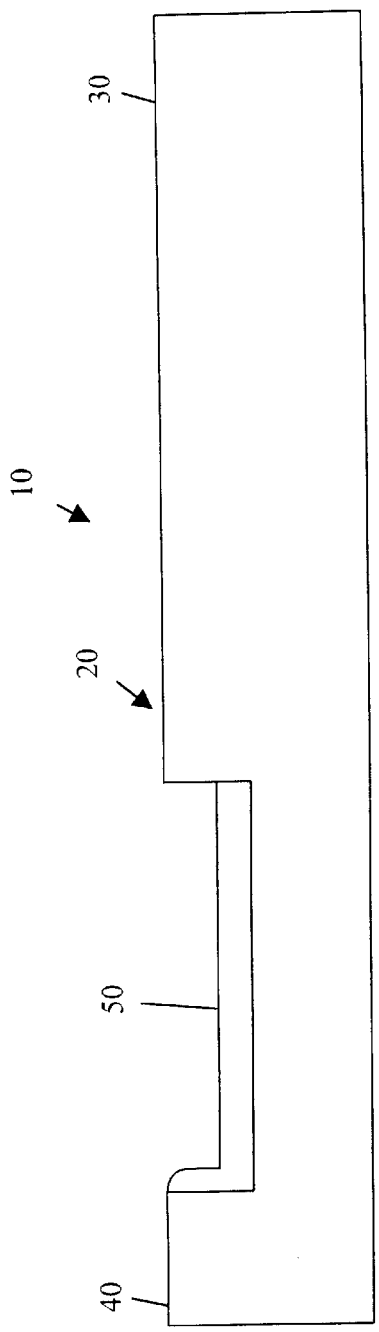
FIG. 3 is a side view of an alternative embodiment of the optical fiber holder without an optical fiber disposed therein.

Although FIGS. 1–3 do not depict the optical fiber holder 10 with a connector attached to it, preferably, a connector is attached to the outer surface of the first end 30 of the optical fiber holder 10. Any connector known to those skilled in the art may be used, but preferably the connector is an optical fiber connector. The connector is positioned such that the exposed optical fiber may be inserted into a contacting chamber and set into place. The connector permits the optical fiber holder 10 to be used with a vessel, however if no connector is attached, the optical fiber holder 10 may simply be hand-held and dipped into the sample to be tested.

Figure 4:
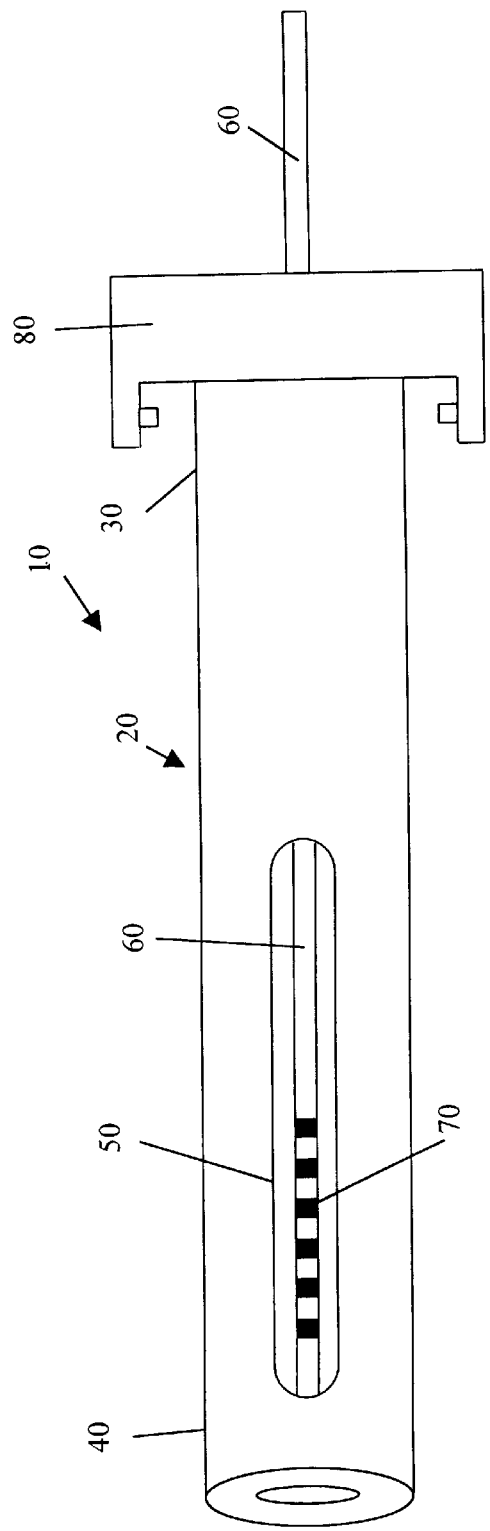
FIG. 4 is a side view of the optical fiber holder with a connector attached thereto and an optical fiber disposed therein.

FIG. 4 depicts another embodiment of the optical fiber holder 10 where an optical fiber device 60 is disposed within the tube 20. The optical fiber device 60 has a sensing element 70 and is positioned within the tube so the sensing element 70 is positioned within the aperture 50. The optical fiber device may be any optical fiber device known to those skilled in the art. Examples of such devices include but are not limited to: an extrinsic Fabry-Perot Interferometer; an optical fiber sensor; a fluorescent sensor; an optical fiber grating; or a surface plasmon resonance sensor. The optical fiber may have a grating disposed therein such that the grating serves as the sensing element. The grating may be any grating known to those skied in the art, and is preferably either a bragg grating or a long period grating. FIG. 4 also shows a connector 80 attached to the first end 30 of the tube 20. The connector 80 is attached using any means known to those skilled in the art and is typically push-fit and epoxied onto the end of the tube.

Changes in a sample or a particular environment may be easily detected using the optical fiber holder of the present invention. In the simplest configuration, only one optical fiber holder is used. The optical fiber holder comprising a tube having a first end, a recessed second end, a longitudinal axis and an aperture disposed along a length of the longitudinal axis of the tube is provided and an optical fiber device having a sensing element is disposed therein. The sensing element is positioned within the aperture. The optical fiber holder is inserted into a vessel containing a sample and the sample is circulated past the sensing element. Changes in the refractive index profile are measured using standard techniques known to those skilled in the art.

Figure 5:
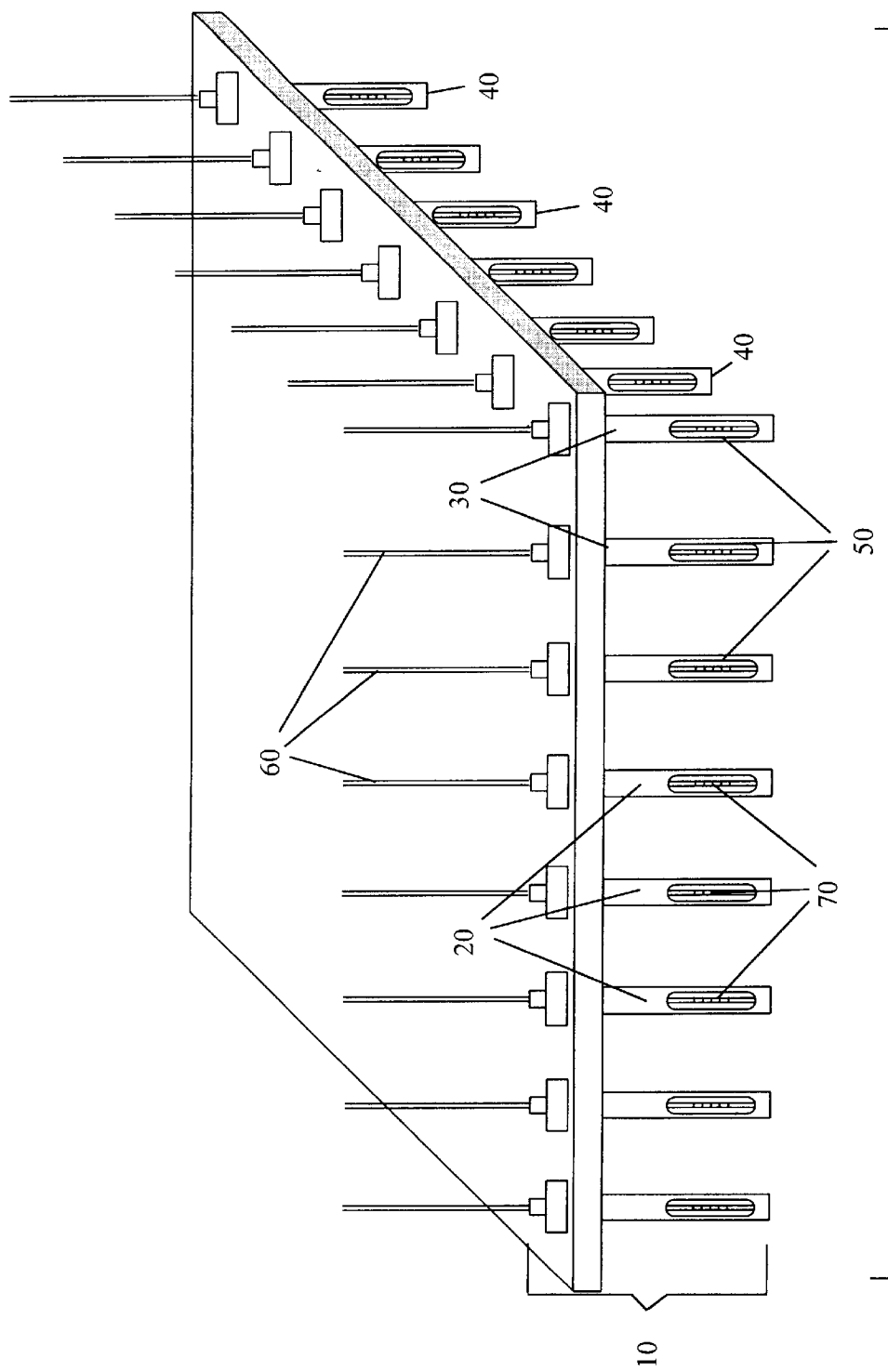
FIG. 5 is a side view of a plurality of optical fiber holders multiplexed into an array format.

In an alternative embodiment, a change in a plurality of samples is detected using a plurality of optical fiber holders. FIG. 5 shows a plurality of optical fiber holders 10 arranged in an array format 90. Each optical fiber holder 10 comprises a tube 20 having a longitudinal axis, a first end 30 for receiving an optical fiber and a recessed second end 40 for protecting the optical fiber tip and an aperture 50 extending along a length of the longitudinal axis of the tube 20. An optical fiber device 60 is disposed within each tube 20. Each optical fiber device 60 has a sensing element 70 disposed therein and each sensing element 70 is positioned within each aperture 50. The optical fiber devices 60 are multiplexed in parallel to form an array format 90. The array format 90 is inserted into a well format. The well format is any well format known to those skilled in the art and in particular is either a 96 well or a 384 well format. These well formats are useful for high throughput screening and clinical diagnostic applications.

EXAMPLE

An optical fiber holder was constructed in the following manner. A tube prepared from polyether ether ketone was extruded to have a length of 2.0 inches, an inner diameter of 0.015 inches, and an outer diameter of 0.125 inches. One end of the tube was drilled to expand the inner diameter to 0.047 inches at a depth of 0.30 inches from the end. A slot having a width of 0.047 inches and a length of 0.50 inches was drilled through the tube approximately 0.375 inches from the end having the larger inner diameter.

An optical fiber containing a long-period grating and having an outer diameter of 250 microns, with jacketing, was inserted into the tube beginning at the end opposite from the end having the larger inner diameter. The end of the optical fiber was positioned so it was recessed slightly from the end of the tube having the larger inner diameter and such that the long period grating was centered directly in the slot of the tube. The long period grating was fastened into place using an epoxy which was applied to the optical fiber at each end of the slot. The epoxy was room temperature-cured to prevent bowing of the optical fiber due to thermal expansion. A gold coating was evaporated onto the end of the tube having the larger inner diameter and containing the recessed optical fiber, to produce a gold reflector. The reflector end was coated with epoxy and cured at room temperature to prevent degradation of the reflector end. A lock fitting was press fit onto the end opposite of the end having the gold reflector and the optical fiber extending outside of the tube and beyond the lock fitting was sheathed with a TEFLON buffer.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. An optical fiber holder comprising:
   A tube including an inner diameter, a first end receiving an optical fiber, and a second end having a recess such that the inner diameter of the second end is larger than the inner diameter at the first end; and an aperture elongated in a direction from the first end to the second end, disposed along the length of the tube for exposing the optical fiber to a sample.

2. An optical fiber holder according to claim 1, wherein the aperture is an elongated slot.

3. An optical fiber holder according to claim 1, wherein the tube has an inner diameter ranging from about 200 microns to about 400 microns larger than the optical fiber outer diameter.

4. An optical fiber holder according to claim 1, wherein the tube is prepared from a material selected from the group consisting of: a silicon micromachined material; a shaped plastic; an epoxy resin; and a metal having a low coefficient of thermal expansion.

5. An optical fiber holder according to claim 1, wherein the tube is prepared from polyether ether ketone.

6. An optical fiber holder according to claim 1, further comprising a connector attached to the first end.

7. An optical fiber holder according to claim 6, wherein the connector is an optical fiber connector.

8. An optical fiber holder according to claim 1, further comprising an optical fiber device disposed within the optical fiber holder, wherein the optical fiber device has a sensing element and wherein the sensing element is positioned within the aperture.

9. An optical fiber holder according to claim 8, wherein the optical fiber device is selected from the group consisting of: an extrinsic Fabry-Perot interferometer; an optical fiber sensor; a fluorescent sensor; an optical fiber grating; and a surface plasmon resonance sensor.

10. An optical fiber holder according to claim 1, further comprising an optical fiber having a long period grating disposed thereon, wherein the optical fiber having a long period grating is disposed within the tube and wherein the long period grating is positioned within the aperture.

11. An optical fiber holder according to claim 1, further comprising an optical fiber having a Bragg grating disposed thereon, wherein the optical fiber having a Bragg grating is disposed within the tube and wherein the Bragg grating is positioned within the aperture.

12. A process for preparing an optical fiber holder, the process comprising the steps of:
   a) providing a tube having an inner diameter, a first end receiving an optical fiber, a second end having a recess such that the inner diameter of the second end is larger than the inner diameter at the first end, the tube having a longitudinal axis;
   b) providing an aperture along a length of the longitudinal axis of the tube for exposing the optical fiber to a sample.

13. A process according to claim 12, wherein the aperture is an elongated slot.

14. A process according to claim 12, wherein the tube has an inner diameter ranging from about 200 microns to about 400 microns larger than the optical fiber outer diameter.

15. A process according to claim 12, further comprising the step of attaching a connector to the first end of the tube.

16. A process according to claim 12, wherein the connector is an optical fiber connector.

17. A process according to claim 12, wherein the tube is prepared from a material selected from the group consisting of: a silicon micromachined material; a shaped plastic; a molded epoxy resin; and a metal having a low coefficient of thermal expansion.

18. A process according to claim 12, wherein the tube is prepared from polyether ether ketone.

19. A process according to claim 12, further comprising the step of inserting an optical fiber device into the tube wherein the optical fiber device has a sensing element and wherein the sensing element is positioned within the aperture.

20. A process according to claim 19, wherein the optical fiber device is selected from the group consisting of: an extrinsic Fabry-Perot interferometer; an optical fiber sensor; a fluorescent sensor; an optical fiber grating; and a surface plasmon resonance sensor.

21. A process according to claim 12, further comprising the step of inserting an optical fiber having a bragg grating into the tube wherein the bragg grating is positioned within the aperture.

22. A process according to claim 12, further comprising the step of inserting an optical fiber having a long period grating into the tube wherein the long period grating is positioned within the aperture.

* * * * *